United States Patent
Icken et al.

(10) Patent No.: US 6,976,078 B1
(45) Date of Patent: *Dec. 13, 2005

(54) PROCESS FOR SIMULTANEOUS USER ACCESS USING ACCESS CONTROL STRUCTURES FOR AUTHORING SYSTEMS

(75) Inventors: Donald A. Icken, Carmel, NY (US);
Neal M. Keller, Somers, NY (US);
Lisa M. Ungar, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/566,320

(22) Filed: May 8, 2000

(51) Int. Cl.[7] .............................. G06F 15/16
(52) U.S. Cl. ................... 709/229; 715/743
(58) Field of Search ............... 709/225, 229; 710/36, 107; 713/200–213; 340/5.8, 5.86

(56) References Cited

U.S. PATENT DOCUMENTS

| | | | |
|---|---|---|---|
| 5,675,782 A * | 10/1997 | Montague et al. | 713/201 |
| 5,999,978 A * | 12/1999 | Angal et al. | 709/229 |
| 6,064,656 A * | 5/2000 | Angal et al. | 370/254 |
| 6,085,191 A * | 7/2000 | Fisher et al. | 707/9 |
| 6,182,226 B1 * | 1/2001 | Reid et al. | 713/201 |

FOREIGN PATENT DOCUMENTS

JP  403014047 A  *  1/1991  .......... G06F 12/00

OTHER PUBLICATIONS

Acces control by Boolean expression evaluation, Miller, D.V.; Baldwin, R.W., Fifth Annual Computer Sercurity Conference, IEEE Computer Society Press, Tucson, AZ, 1990, pp. 131-139.*

* cited by examiner

Primary Examiner—Beatriz Prieto
(74) Attorney, Agent, or Firm—Scully, Scott, Murphy & Presser; Daniel P. Morris

(57) ABSTRACT

The field of distributed authoring systems, and more particularly the implementing of authoring controls within the authoring system. Moreover, the authoring system is provided a process for access by simultaneous users, which employs control structures through an access control engine for dynamically selecting content and display components of an authoring system.

14 Claims, 1 Drawing Sheet

PROCESS FOR SIMULTANEOUS USER ACCESS USING ACCESS CONTROL STRUCTURES FOR AUTHORING SYSTEMS

BACKGROUND OF THE INVENTION

1. Field of the Invention

The present invention relates to the field of distributed authoring systems, and more particularly pertains to the implementing of authoring controls within the authoring system. Moreover, specifically the invention is directed to providing the authoring system with an improved and novel process of enabling access to the system for simultaneous users employing access control structures through the intermediary of an access control engine which is adapted to select criteria to provide system access to selective authors or users while incorporating a mechanism for dynamically enforcing the authoring controls.

In essence, authoring systems, which may also be known as authoring tools or authorware in technological and commercial applications, may be programs existing in hypertext and multimedia applications. Pursuant to more sophisticated applications, in internet, on-line or CD-ROM programs, the authoring systems may be scripting language or graphics elements, or may even represent a mixture of textual (teaching tools, printed works and the like) material, graphical representations, audio data and numerous, practically unlimited types of objects or programs. These authoring systems are ordinarily developed and designed by authors who define the relationships of the foregoing aspects with each other, and sequencing the programs in an appropriate order for data storage.

2. Discussion of the Prior Art

In the present state of the technology and industry, authoring systems are adapted to control authoring access, generally to an authoring system utilizing various control parameters such as check-in/check-out, access control lists, profiles and predefined roles which are assigned to various authors of the system.

In various of the presently developed and known authoring systems, the access control mechanisms which facilitate access to the authoring system are specified or predefined by the system itself; whereas, other authoring systems do not provide access control systems or similar arrangements.

SUMMARY OF THE INVENTION

In order to obviate and overcome the limitations encountered in present authoring systems, a primary aspect of the present invention resides in the provision of an improved access control engine for authoring systems which includes a mechanism for dynamically enforcing authoring controls. The dynamically enforcing authoring control mechanism enables one or more users such as readers or authors to gain access to the authoring system, whereby multiple users may be afforded serial access the authoring system; or users may access the authoring system simultaneously or in an overlapping order in accordance with predetermined criteria or conditions established by the access control engine and enforced by the control mechanism for the authoring systems.

Attributes, logic and values are used to enforce multiple access in the present authoring system. Multiple access is an application of the access control engine (Improved Access Control Engine for Authoring Systems) against these attributes, logic and values. Access enforcement is dynamic, because roles, which contain the attributes, logic and values, can be created dynamically. An individual user's access can change based on 1) a role changing dynamically, or 2) other users entering/exiting the system. In the inventive authoring system, an attribute is a named field associated with content, display components and/or other system elements, and is used to tag a set of values with meaning. An attribute can be used to implement field level access with the appropriate logic. The same attribute can also be used to define custom multiple author relationships. It is not the field level access itself that is important, but that field level access can be used to define multiple author relationships.

Others systems' authoring access is not as tightly tied to content or display. The present authoring system provides an improved and more granular method of controlling authoring relationships, because applicants' system has an access control engine with the ability to handle attributes, logic and values associated with content and display. For example, applicants' authoring system can control access down to the values associated with a specific attribute.

Pursuant to the invention, the applicants implement authoring control directly via attributes, logic and values at document selection time. Other systems use second pass logic, which requires opening the document to check access.

In essence, the authoring system utilizes different parameters or criteria in order to provide reader or author (user) access thereto through the process of employing the access control engine and control structures pursuant to the invention.

Basically, these parameters or criteria include:
a) Userid (User identification)—which is designed to uniquely identify a user or number of users intending to gain permission for access to the authoring system;
b) Active flag—providing for indication that a particular user is logged into the authoring system;
c) Role—is utilized to group users by related functionality, which is implemented by attributes, logic and values, as defined hereinbelow;
d) Attribute—is a named field which is associated with content, display components, and/other system elements; and is utilized to tag or impart a set of values with a specific meaning or meanings;
e) Logic—utilizes boolean logic in order to test a given value against the value of a corresponding attribute in content, display component and/or other system element;
f) Value—defines a constant which is utilized in tabled logic, which is compared with corresponding constants which are assigned to content, display component or system element attributes;
g) Choice components—defines a list of that display component or those display components available to a role for both selection and display mechanisms, and which ties specific display-logic to content attributes;
h) Which display component—list of which particular set of logic is to be used against the attribute in the display mechanism;
i) Permissions—to implement the "access authority of the system" for a specific role as set forth in c) hereinabove.

The foregoing parameters or criteria are employed in that an improved and novel simultaneous user access process pursuant to the invention resolves access control or privileges in the authoring system, utilizing information from both an active user table and an access control structure table. In that instance, the roles are a membership structure utilized to group common functionality and to tie logic to attributes and values. Thus, the roles set forth in an access control table eliminate the need for author profiles in the authoring system, and by introducing logic and display components in the access control engine it is possible to obviate the need for having to execute logic subsequently, as do databases with their views. In the present authoring system, there is no distinction between authors and readers, and a person designated to multiple roles is imparted the combined functionality is of all of the roles. Hereby, functionality defined by the attributes, logic and values, and wherein every access is conveyed to the inventive access control engine, imparting the authoring system with the ability to dynamically reflect changes in the system.

The invention is an improved process of using a system for specifying and customizing an interface as a special case of authoring functionality. Changes in selection and display format privileges as specified by roles, attributes and logic are immediately reflected in modified interfaces. This eliminates the need for multiple separate interfaces. Both the content selected and how it is displayed are affected by the presence of other authors in the system. This flexible system allows for the customized definition of interfaces with differing function and scope of the content they access. This allows the distributed author, for example, faculty working with students on a project via networked personal electronic writing tablets, parents exchanging notes on an electronic home bulletin board with children, or primary writers collaborating with others via the Internet on a book, to easily specify and dynamically update the multiple interfaces.

Accordingly, it is an object of the present invention to provide an improved and novel process imparting access to authoring systems to simultaneous users of the system.

A further object of the present invention resides in the provision of a novel process for enabling simultaneous user access by means of access control structures adapted to implement controls within an authoring system.

BRIEF DESCRIPTION OF THE DRAWINGS

Reference may now be had to the following detailed description of a preferred embodiment of an access control engine and control structures for an authoring system pursuant to the invention, taken in conjunction with the accompanying single figures of drawing; illustrating in a generally diagrammatic representation, an authoring system facilitating simultaneous user access.

DETAILED DESCRIPTION OF A PREFERRED EMBODIMENT

Figure 1:
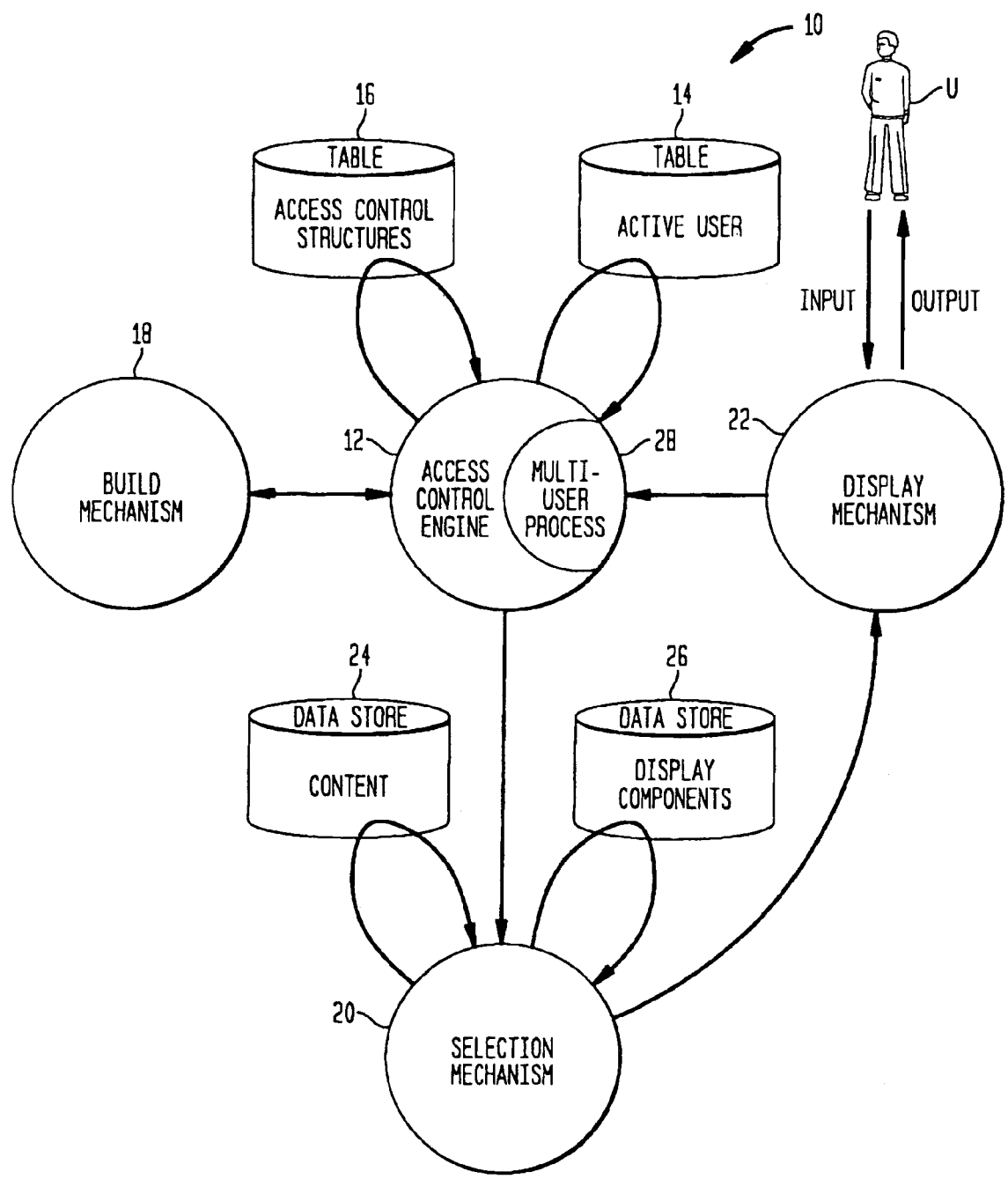

Referring in detail to the single drawing figure, there is illustrated an authoring system 10 including an access control engine 12. The access control engine 12 resolves access control or privileges imparted to a user or plurality of users in the authoring system, utilizing information data, from both an active user table 14 and an access control structure table 16, and with data flow between the components 12 and 14, and respectively, components 12 and 16 of the authoring system 10.

A build mechanism 18 provides for appropriate variable data information and instructions from an external source to be imparted to and direct the access control engine 12, and is adapted to introduce logic and display components into the access control engine.

A selection mechanism 20 derives appropriate information, for subsequent transmission to a display mechanism 22, from a data store 24 having attribute contents stored therein, and from a further data store 26 having display components stored therein for selectively relaying the foregoing data to the display mechanism 22. The latter conveys displaying information to a multi-user process 28 in the access control engine 12.

Thus, as shown in particular, through the Active User Table 14, a user (i.e. reader, author) U may be assigned an active status by setting an Active Flag, indicating that the user has been logged into the authoring system 10 responsive to the Userid (User identification) assigned to the user.

The foregoing user assignment as in the Table 14, may be for any number of users $U_1$, $U_2$, - - - $U_x$, who may be assigned different roles imparting access to the authoring system 10, which may be used to group users by related functionality, as defined by attributes, logic and values. Thus, the Active User Table 14 which identifies the Userid, Active Flag and Role, leads to boolean logic to test a given value against a corresponding Attribute value in the content, display component and/or other authoring system constituents. The role assigned to a particular user may be predetermined by the data supplied to the access control engine 12 by the build mechanism 18, so as to impart to the user specific types of authorities, such as being capable of only reading the author material, or editing the author material at any particular site or sites.

Moreover, by way of example, a user or multiple users may be imparted further roles enabling him or them to access author material at different geographic locations; for instance, a user in New York may be empowered to gain access to author material in New York, Chicago or Los Angeles. Moreover, the user may possibly be empowered to only "read" material in Chicago and Los Angeles, while being able to "edit" the author material in New York, although numerous permutations and different attributes may be assigned to any particular user or users at any specific location or locations in accordance with data supplied to the active user table 14 from the access control engine 12.

The access control structure table 16 assigns to the particular user or users a role, various attributes, (boolean) logic values, choice components and permission for accessing which define the different types of access the user may have by means of the access control engine 12, wherein the table contains the foregoing information which has been imparted thereto through the access control engine 12 by data from the build mechanism 18, which was imputted from an external source or authority. In that instance, the build mechanism 18 assembles or builds the informative/data elements which are needed by the access control engine 12 to provide the required information and criteria to the remaining operative components of the authoring system 10. The selection mechanism 20, in turn, selects the content and display components based on information which is provided thereto by the access control engine 12. In turn, the display mechanism 22 builds or formulates a display which is based on information provided thereto by the selection mechanism 20. The multi-user process 28 of the authoring system utilizes the access control engine 12 in order to determine the relationship between the multiple authors to which access is to be gained.

This invention improves upon authoring systems which provide separate interfaces for specifying authoring functionality. The author uses the same interface to customize their interface and other interfaces. Changes to the roles, attributes and logic are dynamically reflected in the interface. Current authoring systems do not implement this capability as a special case of authoring functionality. It also provides enhanced capability to customized interfaces beyond the few predefined user interfaces typically provided by most authoring systems.

Reverting to a typical scenario in the application of the authoring system 10 through intermediary of the inventive process of simultaneous user access employing the control engine 12 and related control structures, the following data flow sequence is set forth hereinbelow:

1) An individual makes a request.
2) Look up the individual in the active user table.
3) Get the individual's role(s) from the active user table.
4) Look for the other active users in the active user table.
5) Get the other active users role(s) from the active user table.
6) Set the individual's active flag to active in the active user table.
7) Find the individual role(s) in the access control table.
8) Retrieve the logic(s) and choice component(s) from their respective table.
9) Check the logic(s), which contains the attributes and values.
10) Find the role(s) of the other active users in the access control structure table.
11) Retrieve the corresponding logic(s).
12) Check the logic(s), which contain the attributes and values.
13) Check for the individual's attribute(s) against the other active roles' attributes.
14) Transform the individual's logic(s) into a single logic, if there are no attributes or attributes values in common.
15) Check the permission bits, if there are attribute values in common.
16) Transform the individual's logic(s) into a single logic, if the permission bits are not identical.
17) Forward the role name that contains the conflicting information with its corresponding logic to the requesting mechanism.
18) Finally, the underlying system marks when a role enters a document, so that potential future conflicts will be handled when they come up during the selection mechanism.

The foregoing process, in essence, imparts an ability to the access control engine 12 and control structures of the authoring system 10 which receives the access request to implement a process for enabling simultaneous user access which will dynamically reflect and respond to changes in the authoring system.

While the invention has been particularly shown and described with respect to preferred embodiments thereof, it will be understood by those skilled in the art that the foregoing and other changes in form and details may be made therein without departing form the spirit and scope of the invention.

What is claimed is:

1. A method for enabling simultaneous user access for an access control engine within an authoring system, and to enable said authoring system to dynamically reflect and respond to changes within said authoring system, wherein Boolean logic changes dynamically in response to multiple roles and existing attributes and values to enable single pass access, wherein said method comprises:

a) having a single individual enter said authoring system by forwarding a request to said access control engine using information selected from roles, Boolean logic, attributes and values obtained from both an active user table and access control structure table;

b) checking and discovering other active users and associated roles in said authoring system from said active user table and retrieving Boolean logic(s), attributes and values from said access control structure table;

c) transforming and performing conflict resolution on said individual's request using information selected from Boolean logic, attributes and values based on the state of said other active users' attributes and values; and d) forwarding said transformed logic, attributes, values and roles to said access control engine for said single individual to access said authoring system.

2. A method as claimed in claim 1, wherein said method allows selective serial, partial and overlapping access as authors interact.

3. A method as claimed in claim 1, wherein a single role or multiple roles are affiliated with one or more authors and attributes.

4. A method as claimed in claim 1, wherein the user access changes dynamically and transforms in response to the multiple roles and existing attributes and values when another author interacts within the authoring system.

5. A method as claimed in claim 1, wherein roles interact with control structures, existing relationships with other authors, and Boolean logic to generate dynamic selection of content and display components.

6. A method as claimed in claim 1, wherein single or multiple attributes with one or more values are names associated with authors, content, display components, roles and control structures for customized access.

7. A method as claimed in claim 1, wherein an attribute is useable to implement field level access with logic and is useable to define multiple author relationships, and wherein the same attribute or attributes and Boolean logic are useable as either document or field level access as well as for customizing relationships between authors.

8. A method which is readable by machine tangibly embodying a program of instruction executable by the machine for enabling simultaneous user access for an access control engine within an authoring system, and to enable said authoring system to dynamically reflect and respond to changes within said authoring system, wherein Boolean logic changes dynamically in response to multiple roles and existing attributes and values to enable single pass access, wherein said method comprises:

e) having a single individual enter said authoring system by forwarding a request to said access control engine using information selected from roles, Boolean logic, attributes and values obtained from both an active user table and access control structure table;

f) checking and discovering other active users and associated roles in said authoring, system from said active user table and retrieving Boolean logic(s), attributes and values from said access control structure table;

g) transforming and performing conflict resolution on said individual's request using information selected from Boolean logic, attributes and values based on the state of said other active users' attributes and values; and h) forwarding said transformed logic, attributes, values and roles to said access control engine for said single individual to access said authoring system.

9. A method as claimed in claim 8, wherein said method allows selective serial, partial and overlapping access as authors interact.

10. A method as claimed in claim 8, wherein a single role or multiple roles are affiliated with one or more authors and attributes.

11. A method as claimed in claim 8, wherein the user access changes dynamically and transforms in response to the multiple roles and existing attributes and values when another author interacts within the authoring system.

12. A method as claimed in claim 8, wherein roles interact with control structures, existing relationships with other authors, and Boolean logic to generate dynamic selection of content and display components.

13. A method as claimed in claim 11, wherein single or multiple attributes with one or more values are names associated with authors, content, display components, roles and control structures for customized access.

14. A method as claimed in claim 1, wherein an attribute is useable to implement field level access with logic and is useable to define multiple author relationships, and wherein the same attribute or attributes and Boolean logic are useable as either document or field level access as well as for customizing relationships between authors.

* * * * *